United States Patent
Schell

(10) Patent No.: US 12,297,030 B2
(45) Date of Patent: May 13, 2025

(54) RECYCLABLE FILM AND PACKAGING

(71) Applicant: AMCOR FLEXIBLES NORTH AMERICA, INC., Neenah, WI (US)

(72) Inventor: Thomas A. Schell, Neenah, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 483 days.

(21) Appl. No.: 17/609,043

(22) PCT Filed: May 17, 2019

(86) PCT No.: PCT/US2019/032917
§ 371 (c)(1),
(2) Date: Nov. 5, 2021

(87) PCT Pub. No.: WO2020/236140
PCT Pub. Date: Nov. 26, 2020

(65) Prior Publication Data
US 2022/0194681 A1    Jun. 23, 2022

(51) Int. Cl.
| | | |
|---|---|---|
| B65D 81/34 | (2006.01) |
| B32B 27/08 | (2006.01) |
| B32B 27/18 | (2006.01) |
| B32B 27/32 | (2006.01) |
| B32B 27/34 | (2006.01) |
| B65D 65/40 | (2006.01) |
| B65D 75/00 | (2006.01) |

(52) U.S. Cl.
CPC ............ *B65D 81/34* (2013.01); *B32B 27/08* (2013.01); *B32B 27/18* (2013.01); *B32B 27/32* (2013.01); *B32B 27/34* (2013.01); *B65D 65/40* (2013.01); *B32B 2307/308* (2013.01); *B32B 2307/31* (2013.01); *B32B 2307/4023* (2013.01); *B32B 2307/514* (2013.01); *B32B 2439/70* (2013.01); *B65D 75/008* (2013.01)

(58) Field of Classification Search
CPC ...... B65D 81/34; B65D 65/40; B65D 75/008; B32B 27/08; B32B 27/18; B32B 27/32; B32B 27/34; B32B 2307/308; B32B 2307/31; B32B 2307/4023; B32B 2307/514; B32B 2439/70
See application file for complete search history.

(56) References Cited

U.S. PATENT DOCUMENTS

| | | | |
|---|---|---|---|
| 6,524,720 B1* | 2/2003 | Shah | B32B 27/08 428/910 |
| 7,989,083 B2 | 8/2011 | Morikawa et al. | |
| 2004/0229058 A1 | 11/2004 | Trouilhet | |
| 2005/0244664 A1* | 11/2005 | Bekele | B32B 27/08 428/474.7 |
| 2008/0095960 A1* | 4/2008 | Schell | B32B 27/36 428/34.8 |
| 2011/0091695 A1 | 4/2011 | Bevilacqua et al. | |
| 2011/0236708 A1 | 9/2011 | Oysaed et al. | |
| 2013/0048636 A1 | 2/2013 | Mack | |

FOREIGN PATENT DOCUMENTS

| | | |
|---|---|---|
| EP | 1541340 B1 | 2/2007 |
| EP | 3446870 A1 * | 2/2019 |
| EP | 3845380 A1 | 7/2021 |
| WO | 2016109023 A1 | 11/2015 |
| WO | 2019083675 A1 | 5/2019 |

OTHER PUBLICATIONS

Cosmo Films, Uses and Attributes of BOPP Films—Its Pros and its Cons. Nov. 20, 2015 [Retrieved on Jul. 10, 2019]; pp. 1-2 from https://cosmofilms.com/blog/uses-and-attributes-of-bopp-films-its-pros-and-its-cons.

Mitsui Chemical, "Admer QF551E, Technical Data Sheet", Sep. 2022, 2 pages.

Third party observations submitted on Dec. 10, 2024 in EP Application No. 19929771.4, 4 pages.

* cited by examiner

*Primary Examiner* — Callie E Shosho
*Assistant Examiner* — Bethany M Miller

(57) ABSTRACT

A recyclable film contains a base film and a sealant. The base film has at least one layer containing a polar polymer and at least one layer containing a polar polymer compatibilizer. Additionally, the base film has been oriented and annealed such that it exhibits free shrink of less than 10% in both the machine direction and the transverse direction when exposed to heat of 90° C. The film may be used for demanding retort processing applications. This film has advantages over prior recyclable films in efficient film manufacturing, high quality package production and superior package performance.

14 Claims, 3 Drawing Sheets

RECYCLABLE FILM AND PACKAGING

TECHNICAL FIELD

This application relates to films that can be easily recycled. More specifically, high performance packaging films that can be recycled in the polypropylene recycling stream are disclosed.

BACKGROUND

Today, many products such as consumer goods, foods, beverages, pharmaceuticals, industrial chemicals, cleaners, cosmetics and other sensitive items are packaged in high performance packaging. This packaging provides advantages such as high barrier and hermetic seals to help protect and extend the shelf life of the packaged product. The packaging may also include features for consumer ease, such as opening or reclosing features. Materials used to manufacture these packages must endure the package formation process, package filling conditions and environmental stresses from storage, shipping and distribution. These demands are generally met by multilayer packaging that incorporates several different high-performance materials.

In many cases, high performance packaging is designed with exterior layers such as OPET (biaxially oriented polyethylene terephthalate) or BON (biaxially oriented nylon) which provide high stiffness, dimensional stability and heat resistance. High performance packaging also may include barrier materials such as aluminum foil, PVdC (polyvinylidene chloride) or EVOH (ethylene vinyl alcohol copolymer). These materials are added to a structure that also includes polymers specific for sealing, polymers designed to bind the structure together, printing inks, and adhesives, to name a few. The combination of these various materials creates a film that is very difficult to recycle in available recycling streams. As a result, these packaging films are typically considered "waste" after the package has been emptied.

Polypropylene containing structures have been developed for retortable packaging. Polypropylene sealant materials have the properties suitable for high heat treatment, maintaining a hermetic seal and good appearance after the retort process. However, polypropylene is often mixed with other high-performance materials, making the total package difficult to recycle.

In some cases, compatibilizers are added to various layers of the packaging film to assist with the incorporation of multiple materials into a single material recycling stream. These film structures continue to lack the properties to match the non-recyclable high-performance packaging materials that are sold today. Improvements are needed to achieve high performance packaging film materials that can 1) be efficiently converted, 2) have a comparable cost to current films, 3) be used on existing packaging equipment, 4) have acceptable appearance and 5) be efficiently recycled into the polypropylene recycling stream.

SUMMARY

Disclosed herein are recyclable films having a base film and a sealant. The base film has a first polar layer comprising a polar polymer and a compatibilizer layer comprising a polar polymer compatibilizer. The recyclable film also optionally includes printed indicia located between the base film and the sealant. The base film is oriented and annealed such that the base film has a free shrink value of less than 10% in both the machine direction and the transverse direction when tested according to ASTM D2732 using bath temperature of 90° C.

In some embodiments of the recyclable film, the polar polymer of the first polar layer is a polyamide. The base film may further comprise a second polar layer comprising a polar polymer. The first polar layer may be an outer layer of the base film. The sealant of the recyclable film may be a sealing layer that is an outer layer of the recyclable film, the sealing layer comprising polypropylene.

Also disclosed herein are retortable packages using any embodiment of the recyclable films.

Some embodiments of the recyclable film comprise a) a first exterior surface comprising a base film, wherein the base film is oriented, b) a second exterior surface comprising a sealant comprising polypropylene, c) a polar layer comprising a polar polymer, and d) a compatibilizer layer comprising a polar polymer compatibilizer. The recyclable film may also have a barrier layer between the first exterior surface and the second exterior surface.

The recyclable film may have a first exterior surface having a polyamide. The base film may be a biaxially oriented polyamide. The base film may be a biaxially oriented polypropylene film. The polar polymer may be an ethylene vinyl alcohol copolymer.

The recyclable films may have a base film comprising a) a first outer layer comprising a polyamide, b) a compatibilizer layer, c) a first tie layer located between the first outer layer and the compatibilizer layer, d) a second outer layer comprising a polyamide, and e) a second tie layer located between the compatibilizer layer and the second outer layer. The compatibilizer layer may comprise i) a polypropylene, polypropylene copolymer or blends thereof, and ii) a compatibilizer comprising a low molecular weight anhydride or carboxylic acid functionalized polypropylene. The base film may be oriented. The recyclable film may have a sealant and the sealant may be a polypropylene. A retortable package may be made using the recyclable film.

Some embodiments of the retortable package are made with a recyclable film comprising a base film and a sealant, wherein at least one of the base film or the sealant comprises a polar polymer compatibilizer layer, and wherein the recyclable film is recyclable in a polypropylene waste stream. The base film may be oriented and the recyclable film may further comprises a barrier layer.

BRIEF DESCRIPTION OF THE DRAWINGS

The disclosure may be more completely understood in consideration of the following detailed description of various embodiments of the disclosure in connection with the accompanying drawings, in which.

Figure 1:
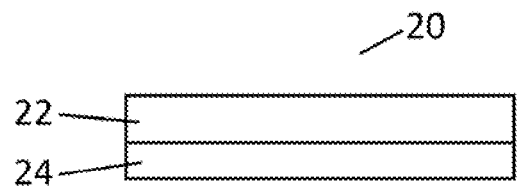
FIG. 1 is a cross-sectional view of a first embodiment of a base film for a recyclable film.

The drawings show some but not all embodiments. The elements depicted in the drawings are illustrative and not necessarily to scale, and the same (or similar) reference numbers denote the same (or similar) features throughout the drawings.

DETAILED DESCRIPTION

High performance flexible packaging is designed to deliver speed, performance and cost efficiency in both the process to manufacture the packaging material and the process to manufacture a finished package. High performance packaging also provides protection to the products inside while maintaining an impressive appearance. High performance packaging that is designed for retorted product applications has especially high-performance criteria, needing to survive the process and protect the product during and after retorting. Typically, high performance packaging materials are designed using a complex combination of materials to achieve these requirements. Unfortunately, this combination of materials often makes the packaging material difficult to recycle into a standard reprocessing or recycling stream.

In recent years, packaging materials have been developed with recycling in mind. However, these materials often Fall short of delivering the standard requirements of product protection, good appearance and low cost. The recyclable films described herein incorporate combinations of polar polymers, compatibilizers, and a sealant to design a high-performance packaging film that meets both recycling and performance criteria. The packages described herein are made with recyclable films that are designed to have high barrier, excellent appearance (clarity), good heat resistance (low shrink), high quality graphics, and good durability. The recyclable films described herein are especially suited for use as retortable packaging. The recyclable films described herein have superior performance to recyclable films available in the market today.

The recyclable films, as well as packages and/or containers including such films, preferably have seal strength, thermal stability, and heat resistance properties that allow them to be subjected to heat sealing conditions without loss of desired functional and visual characteristics. Recyclable films that contain base films that contain polar polymers and are oriented and annealed show improved properties with respect to heat resistance, appearance and overall performance as compared to other recyclable films.

The recyclable films described herein may be recycled after their primary use is completed. In general, the term recyclable means that the product is suitable for reuse. An example of one specific context of recyclable is reusing a plastic grocery bag a second time to contain some other items. The plastic bag has been reused and recycled. In a slightly different context, recyclable means that the product is suitable for reuse after being converted into a new product. As used herein, the term "recyclable" is meant to indicate that the film can be convened into a new useful item, by means of reprocessing in a polypropylene waste stream or a recycling process that accepts polypropylene based materials. Reprocessing may entail washing, separating, melting and forming, among many other steps. Typically, when plastic packaging is reprocessed, the material is mechanically chopped into small pieces and then melted to be reformed into the new product. If multiple incompatible materials are present in the packaging, interactions occur during reprocessing causing gels, brittle material, poor appearance and generally un-usable or poor-quality products. Using the term "recyclable" indicates that these drawbacks are generally not present. Qualification as a recyclable material is not regulated by any specific agencies but can be obtained from specific groups such as Association of Plastic Recyclers (APR) and How2Recycle™. Recyclable films disclosed herein may be suitable tier polypropylene recycling streams. Introduction of a recyclable film into any of these recycling-by-reprocessing avenues should not require additional compatibilizer.

The recyclable films described herein use an oriented base film. In some embodiments of the recyclable film, the base film may have a combination of various layers, including but not limited to, a polar layer and a compatibilizer layer. The base film is oriented and annealed. The materials in the base film and the processing techniques to manufacture the base film combine to create a cost effective and high-performance film with good heat resistance, low shrink, and dimensional stability. The base film has performance properties that are required for retortable packaging.

Some embodiments of the recyclable film use an oriented film that essentially comprises a single polymer. In some cases, the base film comprises a single layer, essentially comprising a single polymer. The base film may or may not comprise a polar polymer. In addition, the base film may contain other materials such as additives, such as slip or antiblock. For example, the base film may be a biaxially oriented polyamide film or a biaxially oriented polypropylene film.

In some embodiments of the recyclable film, the base film contains at least one polar layer that contains a polar polymer. The term "layer", as used herein, refers to a building block of films that is a structure of a single material type or a homogeneous blend of materials. A layer may be a single polymer, a blend of materials within a single polymer type or a blend of various polymers, may contain metallic materials and may have additives. Layers may be continuous with the film or may be discontinuous or patterned. As used herein, the term "polar polymer" is used to denote a polymer formed from at least one monomer that comprises at least one heteroatom, such as oxygen (O), nitrogen (N), phosphorus (P) or sulfur (S). Non-limiting examples of polar polymers that are typically used in packaging applications are polyester, polyamide and ethylene vinyl alcohol copolymers. Specifically, a polar polymer may be a retortable grade of ethylene vinyl alcohol copolymer. A polar layer may contain more than one polar polymer. In addition to the polar polymer, a polar layer may contain other materials such as other polymers or additives, such as slip or antiblock. Preferably, the polar layer is made of at least 50% polar polymer, or more preferably more than 70%, more than 80%, more than 90% or more than 95% polar polymer.

In some embodiments, the polar polymer in the polar layer may be a polyamide. The term "polyamide" refers to a high molecular weight polymer having amide linkages (—CONH—)$_n$ which occur along the molecular chain, and includes "nylon" resins which are well known polymers having a multitude of uses including utility as packaging films. Non-restricting examples of polyamides include nylon homopolymers and copolymers such as nylon 4,6 (poly (tetramethylene adipamide)), nylon 6 (polycaprolactam), nylon 6,6 (poly(hexamethylene adipamide)), nylon 6,9 (poly (hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6,6/9 resins (e.g., manufactured by the condensation of epsilon-caprolactam, hexamethylenediamine and azelaic acid), nylon 11 (polyundecanolactam), nylon 12 (polylauryllactam) and mixtures thereof.

Polyamide is used in films for food packaging and other applications because of its unique physical and chemical properties. Polyamide is selected as a material to improve temperature resistance, abrasion resistance, puncture strength and/or barrier of films. Properties of polyamide-containing films can be modified by selection of a wide variety of variables including copolymer selection, and converting methods (e.g. coextrusion, orientation, lamination, and coating).

In some embodiments, the polar polymer in the polar layer is ethylene vinyl alcohol copolymer (EVOH). As used herein, "EVOH" refers to ethylene vinyl alcohol copolymer. EVOH is otherwise known as saponified or hydrolyzed ethylene vinyl acetate copolymer and refers to a vinyl alcohol copolymer having an ethylene comonomer. EVOH is prepared by the hydrolysis (or saponification) of an ethylene vinyl acetate copolymer. The degree of hydrolysis is preferably from about 50 to 100 mole percent, more preferably from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene. It is expected that processability and orientation would be facilitated at higher ethylene contents; however, gas permeabilities, particularly with respect to oxygen, may become undesirably high for certain packaging applications which are sensitive to microbial growth in the presence of oxygen. Conversely, lower ethylene content may have lower gas permeabilities, but processability and orientation may be more difficult. In some embodiments, ethylene-vinyl alcohol copolymers comprise from about 27-48 mole % ethylene, 27-44 mole % ethylene, or even 27-29 mole % ethylene. EVOH may be further optimized by blending, special copolymerization or crosslinking to be more heat resistant or enhance other properties.

In some embodiments of the recyclable film, the base film has at least two polar layers. The base film could have one, two or more polar layers. The polar layers may be separated by compatibilizer layers, tie layer or other layers, as will be described. In the case where the base film does contain more than one polar layer, the polar layers may have the same composition or different composition. For instance, the base film may have one polar layer that contains polyamide and a second polar layer that contains EVOH. In some embodiments, the base film contains two polar layers, each containing polyamide.

By nature of their chemical makeup, many polar polymers typically used for the production of films have generally different properties as compared to non-polar polymers (i.e. those polymers containing only carbon atoms in the polymer backbone). Polar polymers may also provide better oxygen barrier, increased stiffness or increased heat resistance. Additionally, these properties may be enhanced upon orientation, as will be discussed below.

It has been unexpectedly found that a base film containing two layers of polyamide separated by a compatibilizer layer and machine direction oriented and annealed, can be used to manufacture a packaging film that has similar machinability and packaging line efficiency as the current packaging structures that use BON or OPET. The addition of the compatibilizer layer surprisingly did not negatively affect the performance of the oriented base film. The addition of the compatibilizer layer surprisingly did not negatively affect the ability to orient the base film. Advantageously, the film using two polyamide layers can be manufactured at a lower cost. The addition of a polar polymer compatibilizer to the layer that separates the two polyamide layers adds the functionality of recyclability to the film, creating a significant advantage, without compromising the physical properties of the film.

Advantageously, one or both outer layers of the base film may be polar layers. Reference to "outer layer" as used herein refers to the layers of a film that are on either major surface of the film, i.e. the layers that are not between two other layers of that film. In some embodiments, both outer layers of the base film are polar layers. In some embodiments, both outer layers of the base film are polar layers that contain polyamide. In some embodiments of the recyclable film, both outer layers of the base film are the same layer (i.e. monolayer base film) and that layer comprises polyamide.

In some embodiments, the outer layer of the base film is also the outer layer of the recyclable film. In other words, the base film is an outer film of the recyclable film and no other films or layers are applied to the outer layer of the base film. In some embodiments, the outer layer of the base film and the outer layer of the recyclable film is a polar layer. Ideally, the outer layer of the base film and the outer layer of the recyclable film is polyamide.

The polar layers of the base film may be of any thickness. Typically, a polar layer represents at least 2% of the total base film thickness before orientation.

The compatibilizer layer of the base film contains materials, "polar polymer compatibilizers", that are able to assist in the incorporation of polar materials into a reprocessing or recycling stream of non-polar polymers. Polar polymer compatibilizers generally increase the stability of the dispersed polar material by providing sites that allow the two materials (polar and non-polar) to interact, increasing miscibility. Use of a compatibilizer in a blend of polar and non-polar materials generally creates a more homogeneous blend, avoiding gels and other issues that cause visual or mechanical property quality issues.

An example of a compatibilizer that can be used in the compatibilizer layer is disclosed in patent document WO16109023, Parkinson et al. (i.e. '023), which is incorporated herein by reference. However, the films disclosed in '023, do not include any form of oriented films, thus lacking in dimensional stability and stiffness required for many high-performance packaging applications.

The polar layer and the compatibilizer layer may contain materials that have differing rheology, morphology, crystallinity, or other physical properties, meaning that they would typically require different conditions for orientation. Surprisingly, it was found that polar layers and compatibilizer layers containing polar polymer compatibilizers could be incorporated into the same base film and sufficiently oriented to induce high-performance characteristics such as temperature resistance. This incorporation of these materials into the same base film help to ensure good recycling due to the proximity of the compatibilizer to the polar materials. The orientation of the base film brings key performance properties to the recyclable film, allowing for direct substitution of the recyclable films for non-recyclable films.

In some embodiments of the base film, the compatibilizer layer is a blend of polypropylene and a low molecular weight anhydride or carboxylic acid functionalized polypropylene. As used throughout this application, the term "polypropylene" refers to a plastomer, homopolymer or copolymer having at least one propylene monomer linkage within the repeating backbone of the polymer. The propylene linkage can be represented by the general formula: $[CH2—CH(CH3)]_n$. Such polypropylene may be a polypropylene impact copolymer, a polypropylene random copolymer or a polypropylene homopolymer, may be syndiotactic or isotactic and/or may or may not be clarified.

While the examples and description of polar polymers herein includes polyamide and EVOH, the polar layers of the recyclable film are not to be restricted to these materials. While the examples and description of the compatibilizers include materials that compatibilize polyamide and EVOH into non-polar polymer recycling streams, the compatibilizers of the recyclable film are not to be restricted to these materials. Another polar polymer may be used along with a functional compatibilizer suited to that polar polymer and it is still within the spirit of this disclosure.

The amount of compatibilizer used should be optimized based on the amount of polar polymer present within the recyclable film structure, the type of polar polymer within the recyclable film structure, and the type of compatibilizer. One of the advantages to inclusion of a compatibilizer within the film structure is that the amount of compatibilizer can be exactly matched to the need.

The base film also may have one or more layers for the functionality of adhesion, such as tie layers or adhesive layers. The term "tie layer," "adhesive". "adhesive layer," or "adhesive coating," refers to a material placed on one or more layers, partially or entirely, to promote the adhesion of that layer to another surface. A "tie layer" refers to a polymeric based material that is coextruded with other layers for the purpose of providing adhesion between two other layers. In the base film of the recyclable film, a tie layer may be positioned between the polar layer and the compatibilizer layer. Tie layers may also be used to provide adhesion for any other layers that may be present in the base film. The tie layers may also contain materials for other functionality such as moisture barrier. In some embodiments, the tie layer(s) in the base film contains a propylene-based polymer that has maleic anhydride grafted functionality. "Adhesive". "adhesive layers" or "adhesive coatings" are positioned between two films or layers to maintain the two materials in position relative to each other and prevent undesirable delamination. Unless otherwise indicated, an adhesive layer or a coating can have any suitable composition that provides a desired level of adhesion with the one or more surfaces in contact with the adhesive layer material, as long as it does not interfere with the recyclability or other performance properties of the film.

The base film of the recyclable film may contain other functional layers, such as bulk layers, layers for pigmenting, or barrier layers, as long as the content of these layers does not frustrate the recyclability of the overall film. Specifically, layers of the base film may contain recycled content such as post-consumer recyclate or post-industrial recyclate. Specifically, a layer of the base film may contain reprocessed scrap, such as edge trim, from the production of the base film or recyclable film itself (i.e. closed loop industrial recycling).

Figure 2:
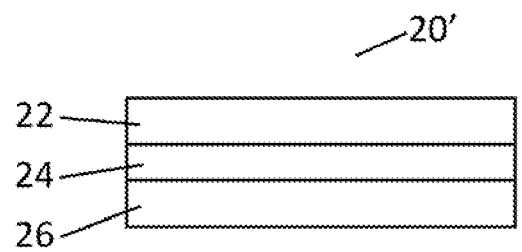
FIG. 2 is a cross-sectional view of a second embodiment of a base film for a recyclable film.
Figure 3:
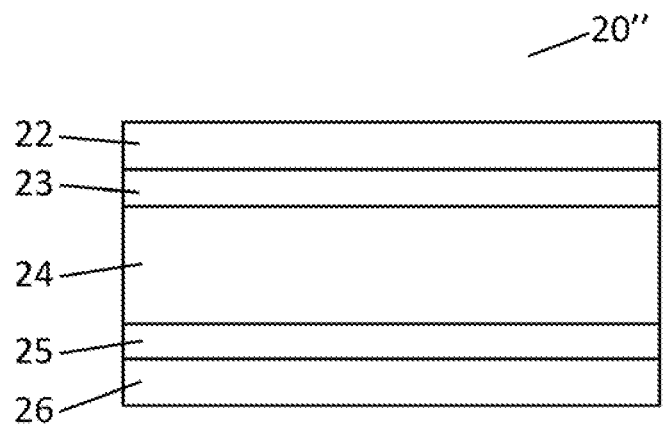
FIG. 3 is a cross-sectional view of a third embodiment of a base film for a recyclable film.

Non-restricting embodiments of the base film are shown in FIGS. 1, 2 and 3. In FIG. 1, the base film 20 has a polar layer 22 and a compatibilizer layer 24. In this embodiment, the polar layer 22 is directly adjacent to the compatibilizer layer 24, but other embodiments may include intervening layers. Additionally, the polar layer 22 and the compatibilizer layer 24 are each shown as outer layers of the base film. In other embodiments, the polar layer and/or the compatibilizer layer are not outer layers.

FIG. 2 shows an embodiment of the base film 20' that includes two polar layers. The first polar layer 22 is shown as a first outer layer of the base film and the second polar layer 26 is shown as a second outer layer of the base film. Compatibilizer layer 24 is shown in the preferred location, between the first and second polar layers. As discussed previously, the first and second polar layers may have the same or different composition.

FIG. 3 shows an embodiment of the base film 20" that includes a first tie layer 23 between the first polar layer 22 and the compatibilizer layer 24, and a second tie layer 25 between the second polar layer 26 and the compatibilizer layer 24. The composition of the first and second polar layers may be the same or different. The composition of the first and second tie layers may be the same or different. In some embodiments, the composition of the first polar layer and the second polar layer are identical, the composition of the first tie layer and the second tie layer are identical, and the layer thickness are such that the base film is palindromic.

FIGS. 1, 2 and 3 show the preferred embodiments of the base film having the polar layer 22 as an outer layer of the base film 20. However, this is not restrictive and there may be other layers as the outer layer of the base film 20 on either side of the base film.

The compatibilizer layer 24 includes a compatibilizer material, preferably a polar polymer compatibilizer. As shown in FIGS. 1, 2 and 3, the compatibilizer layer 24 (or layers) is in close proximity to the polar layers 22,26. Incorporation of compatibilizer into the recyclable film structure allows for efficient use of the compatibilizer as the amount of compatibilizer can be exactly matched to the amount of polar polymer in the structure. Ideally, the compatibilizer layer should be within the same base film structure as the polar layer. The compatibilizer layer should be close to the polar layer with, ideally, only a tie layer intervening between the two layers. This allows the compatibilizer to be readily available to the polar polymer at the time of recycling and reprocessing. When the compatibilizer is close to the polar polymer, it is most efficiently used (i.e. the optimal minimum amount of compatibilizer is necessary). Locating the compatibilizer layer in close proximity to (near) the polar polymer is a configuration of the base film such that the recyclable film may be recycled in a polypropylene recycling stream without the need for additional compatibilizer. Locating the compatibilizer layer between the first and second polar layers is an example of a configuration of the base film that allows the recyclable film to be recycled in a polypropylene recycling stream without the need for additional compatibilizer.

Advantageously, the polar layers of the base film are spaced from each other by polypropylene based layers, such as tie layers or compatibilizer layers. This type of structure has an effect on the stiffness of the film, especially after orientation of the base film. An oriented and annealed base film of this type of structure (such as those shown as A/B/A of: FIG. 2 or A/C/B/C/A of FIG. 3 structure) has stiffness that matches oriented films typically used on "non-recyclable" high performance packaging, such as oriented polyester (OPET) or biaxially oriented nylon (BON). While retaining the stiffness as compared to OPET or BON, some embodiments of the base film of the recyclable films additionally have the advantage of recyclability in a polypropylene reprocessing stream and are often lower cost.

The base film may be of any thickness.

Production of the base film requires at least the conversion processes of extrusion, orientation and annealing. These processes, in combination with raw material selection, can impart critical properties such as thermal stability and durability. Additionally, the film can be more cost effective than un-oriented materials or oriented materials made from a single polymer.

The layers of the base film can be extruded either in combination (coextrusion) or separately. If done separately, the layers can be combined by known methods of lamination including adhesive lamination or extrusion lamination. Alternatively, layers of the base film can be added by extrusion coating, solution coating, or any other known converting method. A combination of extrusion and lamination processes may be used to manufacture the base film. The base film, or any particular layers of the base film, may be extruded using either flat or annular die type processes.

After all the layers of the base film have been assembled, orientation of the film is performed. Orientation may be mono-directional (machine direction or transverse direction), or bi-directional stretching of the film, increasing the machine direction and/or transverse direction dimension and subsequently decreasing the thickness of the material. Bi-directional orientation may be imparted to the film simultaneously or successively. Stretching in either or both directions is subjected to the film in the solid-phase at a temperature just below the melt temperature of the polymers in the film. In this manner, the stretching causes the polymer chains to "orient", changing the physical properties of the film. At the same time, the stretching thins the film. The resulting films are thinner and can exhibit significant changes in mechanical properties such as toughness, heat resistance, stiffness, tear strength and barrier.

The amount of orientation imparted on the base film can affect the properties thereof. In the case of a machine direction oriented base film, stretching of at least 2× (2 times) may be necessary to achieve optimal film properties, such as stiffness and appearance. However, in some embodiments the base film may be stretched to a level less than 2×. In other embodiments the base film may be machine direction stretched at least 2.5×, 3.0×, 3.5×, 4×, 5×, 6×, any value in between these, or more. In other words, the dimension of the film is increased 2 times the original length, increased 2.5 times the original length, etc. Biaxially oriented base films may be stretched at similar levels as mono-oriented films, through either a tenter-frame process (flat die) or a bubble process (tubular die).

Also important to the properties of the base film is the annealing process. After orientation, the films have an embedded stress. Upon heating the film, this stress may be released, causing the films to shrink back to their original, pre-orientation, size. This may be problematic when applying heat to the base film during the process of heat sealing the recyclable film in a packaging application. Shrinkage of the base film at this point will result in a poor appearance in the heat seal area of the package. The process of annealing can help alleviate the embedded stress caused by orientation and the film will be "heat set" such that it will not shrink back to the original size at lower operating temperatures. It has been found that annealing the film at a temperature of about 120° C. using annealing rollers, results in a base film that can be converted easily (printed/laminated/etc.) and is capable of being part of a recyclable film that can be heat sealed to other packaging components without detrimental visual effects.

The base film may be oriented and annealed in line. The base film may be biaxially oriented and annealed in line using known processes. The base film may be coextruded in a tubular format, oriented in-line (machine direction or biaxially) and annealed in-line. The base film may be coextruded on a flat die system with machine direction orientation and annealing in-line. The base film may be coextruded on a flat die system and machine direction stretched followed by transverse direction stretched (i.e. tenter frame orientation process) and annealed in-line. Alternatively, the processes of orientation and annealing may be done in separate processes. Annealing is typically accomplished in-line through high diameter rollers set up at temperatures a few degrees lower than the melting point of the polymer or blend of polymers present in the film. However, annealing can be done by any known means including hot air or IR heating.

The recyclable films disclosed herein also include a sealant. As used herein, a "sealant" is a material, layer or film that allows the recyclable film to be bonded to itself or other packaging components, forming a package. A sealant may form a bond under the influence of pressure or heat or a combination of these conditions. A sealant may be in the form of a film or a coated layer and may be continuous or discontinuous (patterned). Alternatively, the base film may perform the function of the sealant. Embodiments of the recyclable film may include any known sealants such as, but not limited to, adhesives, hot melt, cold seal materials, heat seal films, and heat seal coatings.

Figure 4:
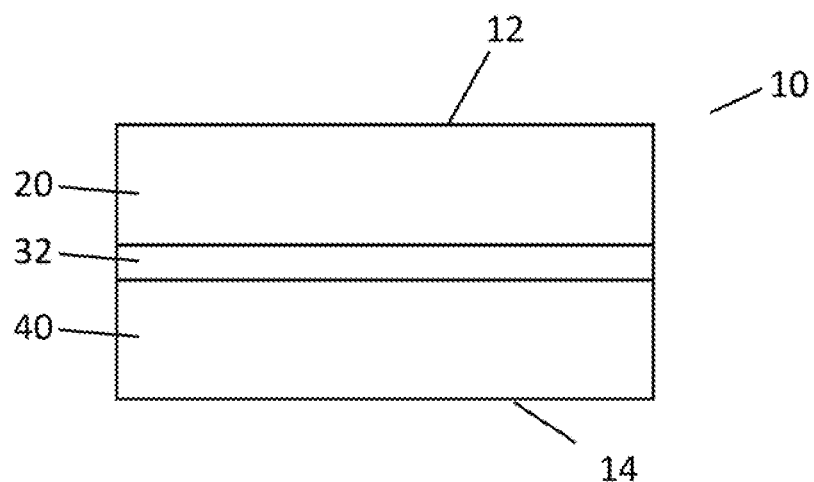
FIG. 4 is a cross-sectional view of a first embodiment of a recyclable film.
Figure 5:
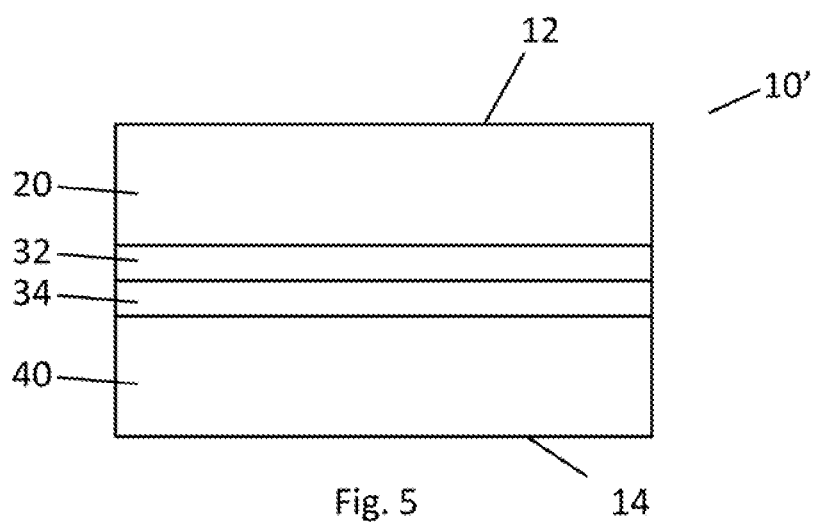
FIG. 5 is a cross-sectional view of a second embodiment of a recyclable film.

The sealant may be applied directly to the outer layer of the base film. The sealant may be applied directly to an outer polar layer of the base film. Alternatively, there may be intervening materials between the base film and the sealant, such as, but not limited to, printed indicia, barrier materials, primers or adhesives. FIGS. 4 and 5 show embodiments of the recyclable film 10,10' that have a base film 20 and a sealant 40. Between the base film and the sealant is an optional layer of printed indicia 32. FIG. 5 includes an optional layer of adhesive 34. These embodiments show an optimal arrangement of materials for high performance packaging films, allowing for optimal positioning of the abuse resistant base film (on the exterior), the printed indicia (viewable through the base film yet protected from environmental conditions) and the sealant material (allowing for sealing as the outer layer of the film).

Also shown in FIGS. 4 and 5 are the exterior surfaces 12,14 of the recyclable film 10,10'. As used herein, an "exterior surface" of the recyclable film is one that is exposed to the environment and does not have another film layer adjacent to it. In some cases, there is another material, such as a coating or printed indicia on the exterior surface. The first exterior surface 12 may be composed of the base film 20 and is generally meant to be facing toward the outside of a package in which the recyclable film may be used. The second exterior surface 14 may be composed of the sealant 40 and is generally meant to be facing toward the inside of a package in which the recyclable film may be used.

The sealant of the recyclable film may be a polymeric based film, manufactured in a separate process, and subsequently adhered to the base film. Alternatively, a sealant film may be extruded and simultaneously attached to the base film in an extrusion coating type operation. Sealant films may be monolayer or multilayer and may be produced by any known process. A sealant film that is multilayer contains a sealant in a sealing layer. Ideally, the sealant film has not been oriented and has no embedded stress (i.e. the sealant film has zero or near zero free shrink). Alternatively, the sealant may be oriented, as well as fully or partially annealed.

The sealant film may contain any type of material that will allow for bonding during a package production operation.

Sealing materials need to be chosen based on the process to be used for sealing and the material/component that the recyclable film will be sealed to.

A preferred sealant comprises (e.g., in a major amount of greater than 50% by weight) or consists essentially of (1) a polypropylene or (2) a blend of polypropylene and at least one other polyolefin. Polyolefins include polyolefin plastomers, such as, for example polyethylene plastomer that may be blended in the sealing layer. The sealant may also comprise or consist essentially of (1) a cast retortable grade polypropylene (2) a coextruded polypropylene polymer or copolymer, or (3) a blend of a coextruded polypropylene polymer or copolymer and at least one other polyolefin. In one embodiment, the sealant comprises 100% by weight of cast retortable grade polypropylene. A representative cast retortable grade polypropylene has a density of about 0.9 g/cm3 and melt flow index of 2.1 g/10 min.

In the case where the recyclable film is used for retort packaging, the seals made to create the package should have a seal strength generally from about 10 N/15 mm to about 200 N/15 mm, according to ASTM-F88 with a crosshead speed of 2.12 cm/sec. The seal strength should be retained at greater than 65%, greater than 80% or typically even greater than 90% after being subjected to retort heat treatment conditions. A retortable package is one that can withstand representative retort heat treatment conditions. These conditions include exposure of the package to (1) a temperature of 110'C for 30 minutes, (2) a temperature of 110° C. for 60 minutes, (3) a temperature of 135'C for 30 minutes or (4) a temperature of 135° for 60 minutes. In addition to seal strength retention after retort heat treatment, the recyclable films described herein should also not delaminate. The retortable packages disclosed herein should retain seal integrity and appearance after exposure to the retort heat treatment.

Certain embodiments of the recyclable film include a multilayer sealant film that incorporates other layers such as barrier layers, bulk layers, mechanical strength layers, pigmented layers, etc. In fact, the sealant film may even include additional polar layers along with additional compatibilizer layers.

The recyclable film will need significant barrier properties when used in a retort packaging application. The oxygen barrier transmission rate should be from about 0.16 cc/m²/day to about 62 cc/m²/day, or from about 0.16 cc/m²/day to about 1.6 cc/m²/day when tested at 23° C. The moisture vapor transmission rate should be from about 0.47 g/m²/day to about 7.8 g/m²/day or from about 0.47 g/m²/day to about 3.9 cc/m2/day when tested at 100° C. and 90% relative humidity.

Figure 6:
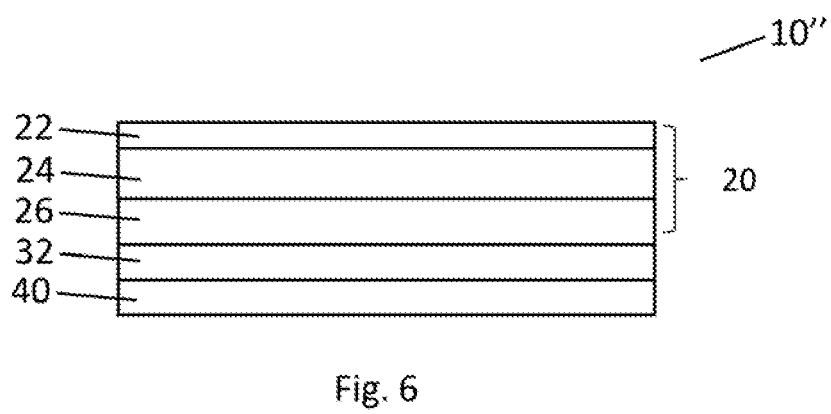
FIG. 6 is a cross-sectional view of a third embodiment of a recyclable film.

FIG. 6 shows a preferred embodiment of the recyclable film 10". The base film 20 has two outer polar layers 22,26 and a compatibilizer layer 24 between them. The outer polar layer 26 has printed indicia 32 applied to it, followed by a sealant 40. This arrangement provides superior heat resistance and appearance in a high-performance recyclable packaging film. Again, the printed indicia layer is optional, and there may be other layers between the base film and the sealant, such as adhesive, barrier layers or primers.

The sealant of the recyclable film may be designed for other functionality. Sealants often contain additives such as slip or antiblock. Sealants also may have antifog properties, easy tear properties, high opacity agents, pigments, antiscalping properties, or high barrier properties, including but not limited to oxygen or moisture barrier. For example, a recyclable film may contain titanium dioxide ($TiO_2$) to increase opacity and stiffness. The recyclable films described herein may contain any of these additives, as long as they do not interfere with the recycling process.

The sealant may also be formulated to provide a peelable seal. As used herein, a "peelable seal" is one that can be separated manually (i.e. by hand, without the use of a tool). Seal strength may be tested using ASTM F88 and a peelable seal may result in a force of between 200 and 2,500 g/in. Often, peelable seals are used for consumer convenience. In the case of a recyclable film used as a packaging component, peelable seals may be highly desired such that the recyclable film may be easily separated from the remainder of the packaging components, facilitating easy recycling. In some cases, the other packaging components that may be present may be recycled in the same stream, may be recycled in a different stream, may be designed for disposal (waste stream) or may be designed for reuse without recycling.

The recyclable film may also include a barrier material for decreasing the transmission rate of gases or other vapors through the film structure. Many high-performance packaging structures include barrier materials such as EVOH, foil, metalized films, PVdC, polyamide or oxide coated films to achieve the low transmission rates required for extending the shelf life of the product packaged. Many packaged foods and pharmaceuticals (as well as other products) are sensitive to their environment and require a very limited transmission rate through the packaging components. Typically, the barrier materials or barrier layers are tuned to low transmission of oxygen (oxygen barrier materials, oxygen barrier layers) or moisture (moisture barrier materials, moisture barrier layers). A barrier material may be incorporated into the recyclable film in any location.

There may be a barrier layer located within the base film of the recyclable film. A non-limiting example is a base film with at least one polar layer containing EVOH. EVOH has excellent oxygen barrier, which is enhanced upon orientation. EVOH in the base film could provide an improved effect of good barrier, good heat resistance, good thermal stability, printability and good appearance. Additionally, locating the EVOH in the base film in close proximity to the polar polymer compatibilizer creates a material that can be efficiently recycled, without the need for additional compatibilizer.

In some embodiments, there may be a barrier layer within the sealant of the recyclable film. Traditional non-recyclable high-performance packaging materials often use extrudable barrier materials such as EVOH or polyamide in multilayer sealant films. This type of sealant film structure could be incorporated into the recyclable films as well, if there is enough compatibilizer in the recyclable film to allow for recycling of the film in the polyethylene recycling stream without the need for additional compatibilizer. Typically, if a polar polymer barrier material is incorporated in the sealant, a compatibilizer should be incorporated into the sealant as well.

In some embodiments of the recyclable film, there may be a barrier layer located between the base film and the sealant. The oriented base film provides an excellent opportunity to apply barrier coatings, as it has the proper heat resistance, low shrink and thermal stability to withstand the processes necessary for applying the barrier. For example, the oriented and annealed base film could go through a metalization process that would deposit a thin layer of aluminum to an outer layer. In some embodiments, the outer layer of: the base film may have printed indicia applied followed by a barrier coating. Alternatively, the outer layer of the base film could have a barrier layer applied first, followed by an optional printed indicia application. Barrier coatings may be any known chemistry, such as aluminum oxide, silicon oxide, crosslinked acrylates or partially neutralized acrylic polymers. Thin layers of depositions or coatings may be useful for the recyclable films as the amount of material used can be easily incorporated into the recycling stream without the need for compatibilizers.

As indicated previously, the recyclable film can incorporate printed indicia. The indicia may be incorporated into the recyclable film in any known process. High performance packaging is typically converted in high speed processes such as rotogravure printing, flexographic printing, or digital printing. For many applications, the printed indicia that is applied to the film is registered with tight repeat tolerances (i.e. each impression of print must be nearly identical in size). The thermal stability of the oriented and annealed base films described herein is useful for these types of printing processes. The base film can have high quality printing applied to either or both outer layers. As shown in FIGS. 4, 5 & 6, the printed indicia may be located between the base film and the sealant, protecting the indicia from external abuse such as scuffing.

The base film may have a primer applied or another treatment (i.e. corona, plasma or flame treatment) prior to printing to facilitate good ink wetting and adhesion. Printed indicia applied to the outer layer of the base film that is the outer layer of the recyclable film (opposite the side the sealant is attached to) may also include a protecting layer or another layer to create a visual or tactile effect. The printed indicia may be incorporated as a continuous layer or applied as a pattern or vignette (an image created by dots). The printed indicia may be continuous with the recyclable film or only cover a small portion of the film. The printed indicia may be visible from either or both sides of the recyclable film.

While the purpose of the proposed recyclable film is to create a material that can be used in high performance packaging applications, the film may also contain materials that have been recycled. Recycled materials such as previously used packaging (post-consumer recyclate) or film converting trim waste (post-industrial recyclate) may be incorporated into any portion of the recyclable film. The material may not require compatibilizer or a compatibilizer may be added at the point of incorporation.

The base film, sealant or any other portion of the recyclable film may incorporate any other additives known to be used in packaging films, as long as these additives do not interfere with the recycling process. These additives may include, but are not restricted to, nucleating agents, processing aids, pigments, slip, or antiblock. Additives may also be "active" in nature, with the intended purpose of interacting with the environment. One example of an active additive is an oxygen absorber.

The combination of the base film and the sealant may result in a recyclable film that has a first exterior surface of an oriented base film, a second exterior surface of a polypropylene sealant, a polar polymer containing layer, and a polar polymer compatibilizer containing layer. The oriented base film may be a biaxially oriented polyamide film or a biaxially oriented polypropylene film. The polar polymer may be a polyamide or an ethylene vinyl alcohol copolymer. For example, a specific embodiment of the recyclable film may have a structure of: BON/printed indicia/adhesive/polypropylene with compatibilizer/polypropylene tie/EVOH/polypropylene tie/polypropylene sealant.

A specific embodiment of the recyclable film may have a base film containing a first outer layer of polyamide, a first tie layer, a compatibilizer layer, a second tie layer and a second outer layer of polyamide. The compatibilizer layer may contain a polypropylene material (including copolymers or blends of polypropylene materials) and a compatibilizer containing a low molecular weight anhydride or carboxylic acid functionalized polypropylene. Both the first and second tie layers may be functionalized polypropylene materials. This base film may be oriented, and a sealant may be combined with the base film to form the recyclable film. The sealant may be a polypropylene material.

The recyclable film may have any overall thickness necessary for the application in which it will be employed. Recyclable films for packaging applications may have a thickness from 1 mil (25.4 micron) to 10 mil (254 micron), or from 2 mil (51.7 micron) to mil (127 micron).

The stiffness of the base film and the recyclable film is an important attribute of the recyclable films described herein. The oriented base film provides for improved stiffness over previously described recyclable packaging webs. Some embodiments that incorporate a base film that has two polar layers separated by a non-polar layer (i.e. the compabilizer layer) exhibit especially good stiffness characteristics. Surprisingly, it was found that the stiffness of the multilayer base films described herein mimics, or in some cases, improves the stiffness found in current non-recyclable packaging structures that incorporate OPET as exterior webs. The stiffness of the recyclable film may be critical to successful converting of the film on packaging equipment used today. In this manner, adoption of the recyclable film into current packaging applications can be made without higher costs or process inefficiencies. Additionally, the stiffness of a film used as packaging can provide a perception of higher quality and is valued by consumers. Stiffness of the recyclable film or the base film can be measured by a loop stiffness test.

The recyclable films described herein have heat resistance to be used as high-performance packaging films. The base film is configured to withstand high temperatures that the packaging film may encounter, such as, but not limited to, heat from film converting, high temperature heat seal units, high temperature processing such as hot fill or retort, or high temperature consumer use such as microwaving. Heat resistance is evident by low shrink, among other properties. When experiencing a high heat environment, the recyclable film should not shrink or otherwise distort. For example, the heat seal areas on a high-performance package should be smooth and clean, without marring or any indication of shrinking or puckering.

The recyclable films disclosed herein are superior to previously developed recyclable films. Films that utilize only polyethylene materials are prone to scuffing and durability issues. Films that utilize polar materials such as polyamide have increased heat resistance and durability, but still may fall short of currently available non-recyclable films. Polar materials are also more expensive, making a packaging film with high polar material content less economical. However, the recyclable films described herein have heat resistance and durability that mimics non-recyclable films that have BON or OPET exterior layers. The embodiments that employ oriented and annealed base films with outer layers of polar materials are especially advantageous for achieving recyclable films that can be used in high performance packaging that can be converted and distributed while retaining very good appearance, at a feasible cost.

The material selection and processing conditions disclosed herein are critical to achieving a low shrink, heat resistant material. Using polar polymers, such as polyamide, in the base film, in combination with orientation and annealing at the proper conditions, creates a film that exhibits low shrink and good thermal stability at conditions of interest. An analytical approach to testing a materials suitability for high performance packaging applications is a free shrink test (ASTM D2732). The base film may have a machine direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. The base film may have a transverse direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. Preferably, the base film has a machine direction shrink rate of less than 7% and a transverse direction shrink rate of less than 1%, when exposed to heat less than or equal to 90° C. Preferably, the base film has a machine direction shrink rate of less than 5% and a transverse direction shrink rate of less than 5%, when exposed to heat less than or equal to 90° C. The base film may have a shrink rate of less than 2% in the machine direction and 0% in the transverse direction when exposed to heat of 90° C. The base film may have a shrink rate of less than 1% in the machine direction and 0% in the transverse direction when exposed to heat of 90° C.

Similarly, the recyclable film may have a machine direction shrink rate of 10% or less than 10°i° upon application of heat less than or equal to 90° C.; or less than 9%, less than 8%, less than 7%, less than 6%, less than 5%, less than 4%, less than 3%, less than 2%, or less than 1%. The recyclable film may have a transverse direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. Preferably, the recyclable film has a machine direction shrink rate of less than 7% and a transverse direction shrink rate of less than 1%, when exposed to heat less than or equal to 90° C. Preferably, the recyclable film has a machine direction shrink rate of less than 5% and a transverse direction shrink rate of less than 5%, when exposed to heat less than or equal to 90° C. The recyclable film may have a shrink rate of less than 2% in the machine direction and 0% in the transverse direction when exposed to heat of 90° C. The recyclable film may have a shrink rate of less than 1% in the machine direction and 0% in the transverse direction when exposed to heat of 90° C.

As has been discussed, the recyclable film may contain a barrier layer or barrier material. The recyclable film may exhibit high oxygen or moisture barrier as may be required by packaging applications. Barrier layers may also protect outer films/layers from migration from package contents (for example, oils and the like). The recyclable film may have oxygen transmission levels of less than 1,000 $cm^3/m^2/24$ hours when tested at 0% RH and 23° C. following ASTM F1927. The recyclable film may have oxygen transmission levels less than 100, less than 10, less than 5, or less than 1 $cm^3/m^2/24$ hours. The recyclable film may have moisture transmission levels of less than 100 $g/m^2/24$ hours when tested at 90% RH and 23° C. following ASTM F1249. The recyclable film may have moisture transmission levels of less than 10, less than 5, or less than 1 $g/m^2/24$ hours.

For high performance packaging applications, the recyclable film may have near 100% barrier to visible light (opaque to light), or at least 50% barrier to visible light. This type of recyclable film would be appropriate for packaging applications where a view of the product was not desirable or when light is detrimental to the shelf life of the product.

Alternatively, the recyclable film may have high light transmission and clarity, as is often desirable for packaging applications when it is desirable to view the product through the packaging material. The base film may have a clarity of more than 80%, 85% or 90%. Ideally, the base film should have a clarity of at least 95%, at least 95.5%, at least 96%, at least 96.5%, at least 97%, at least 97.5%, at least 98%, at least 98.5%, at least 99%, at least 99.5%, or 100%, and all values there between, when measured in accordance with the instructions and teachings of ASTM D-1003. Clarity is defined as the percentage of transmitted light that deviates from the incident light by less than 2.5 degrees. The clarity of the base film can be affected by material selection and orientation conditions, as is known in the art.

As has been discussed, the appearance of the packaging material is critical performance criteria for many high-performance packaging applications. In addition to high clarity and high-quality printed indicia, it is often desirable to have a high gloss exterior. The base film may have gloss levels greater than 50, 60, 70 or even 80 (45° gloss, units, ASTM D2457) which is comparable to other packaging materials such as BON. This type of gloss is superior to recyclable packaging films containing only polyethylene-based materials.

When used as a packaging film, the recyclable film may be sealed to itself, or a similar film, or to one or more other packaging components. Other packaging components may include, but are not limited to zippers, fitments, cups or trays. The packaging may also include other components such as patches, liners, sleeves or labels. Packages may be formed from one, two, three or more different packaging components.

The recyclable film is sealed, or connected, to itself or other packaging components to create a hermetically sealed package. The seals may be made by adhesives, heat sealing, ultrasonic sealing, cold sealing, RF welding or any other known bonding method. Hermetic packaging is critical for a wide variety of products, including foods, beverages, pharmaceuticals, consumer goods and other sensitive products. Hermetic packaging can help prevent damage to the product. For many products, achieving good heat seals to create consistently hermetic packages is highly critical. An advantage of the recyclable films disclosed herein is that they are more heat resistant and thus can be formed into hermetic packaging on a more reliable basis. The combination of the high heat resistance of the base film and the sealant layers that provide quality seals is an important advantage to the films presented herein.

It is also an advantage of some embodiments of the recyclable films disclosed herein that they are provided with sealants that achieve peelable seals when heat sealed to other packaging components. Packages can be opened by consumers in many ways, including peeling open manually. Peelable seals are those that can be peeled open by a consumer by hand, without the use of another tool. A consumer can grasp two parts of a package and pull the package open at a heat seal. Peelable seals allow for the product within the package to be easily accessed by the consumer. In some cases, peelable seals can also be manually reclosed and resealed. Additionally, the recyclable films may have peelable heat seals to allow for easy separation of the packaging components. This advantageously allows for proper disposal of the packaging components into other recycling streams or waste streams. The packaging components included in the hermetically sealed package may be recyclable in the same stream as the recyclable film, recyclable in a different stream or not recyclable at all.

The recyclable film may be used in any sort of hermetic package format including, but not limited to, pouches, bags, flow wrap, tray/lid, chub, bulk bag, and blisters. The recyclable film may be used to package any type of product including, but not limited to, dry foods, liquids, meats, cheese, fresh foods, frozen foods, beverages, pharmaceuticals, nutraceuticals, cosmetics, hard-to-hold products, cleaners, chemicals, wipes, medical products, electronic devices, pet foods/treats, bulk products, etc.

Figure 7:
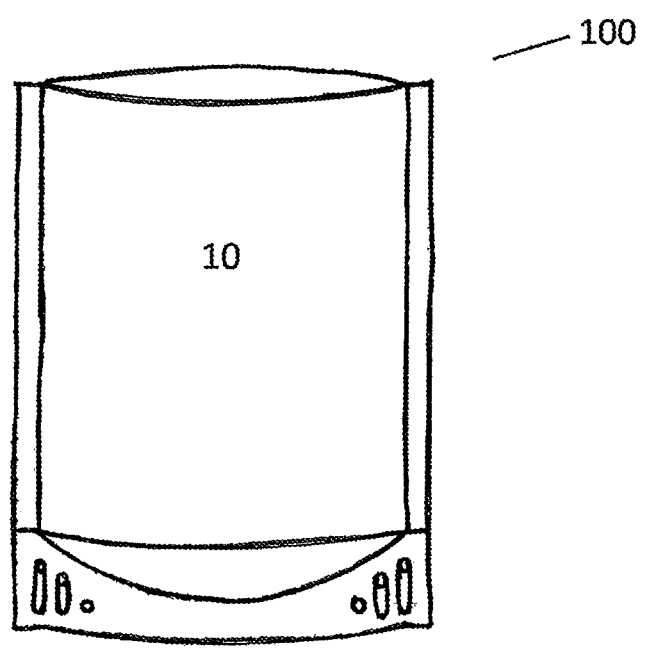
FIG. 7 is a schematic view of embodiments of a package that comprises a recyclable film.

Some embodiments of packages that use the recyclable films disclosed herein are in the format of a pouch, bag or sachet. In this format, the recyclable film is used as in at least one of the side-walls of the package, or in some cases, all the side walls. A pouch or bag may be sealed in a fin seal or lap seal configuration. As shown in FIG. 7, the retortable package 100 may be in the form of a stand-up pouch using the recyclable film 10 as the side walls. Fitments or other closures may be sealed to any part of the recyclable film.

Ideally, the package is configured such that after the contents have been emptied, the package may be opened fully, and the packaging components separated as necessary, for optimal emptying (product removal), rinsing, and recycling. Complete product removal means that the package is free from significant amounts of product that would contaminate the recycling process. Complete product removal may be determined by visual inspection. Complete product removal may be accomplished by rinsing the opened packaging components with water until most or all the product has been removed.

The separation of the packaging components may be facilitated by the previously mentioned peelable seals, or by any other means such as weakened lines or perforations that can be torn open. In some cases, the recyclable film and the other packaging components are designed to be easily torn or cut to facilitate opening. In some embodiments, packaging components remain attached to the recyclable film and are capable of being recycled in the same recycling stream.

In some embodiments, the recyclable film is in the form of a lid that is attached to a tray or cup. The tray or cup may be flexible, semi-rigid or rigid and can be made of any material including, but not limited to, polyester, polyethylene, polystyrene, polypropylene, paper, metal, glass or ceramic. The recyclable film lid must hermetically seal to the tray and may be peelable by manual force. However, the lid must not come off the tray, or otherwise fail, during retort processing.

The recyclable films described herein may also be used for applications that are not related to packaging.

Unless defined otherwise, all technical and scientific terms used herein have the same meanings as commonly understood by one of ordinary skill in the art to which this invention belongs. All publications and patents specifically mentioned herein are incorporated by reference for all purposes.

The following examples are offered for illustrative purposes only and are not intended to limit the scope of the present invention. Indeed, various modifications of the invention in addition to those shown and described herein will become apparent to those skilled in the art from the foregoing description and the following examples and fall within the scope of the appended claims. Non-limiting examples of base films, sealants and additional components of the recyclable film are listed in Tables 1, 2 and 3 below.

TABLE 1

Examples of base films useful in a Recyclable Film

| | |
|---|---|
| Base 1 | Biaxially oriented polyamide (BON) |
| Rase 2 | Biaxially oriented polypropylene (BOPP) |
| Base 3 | Monoaxially oriented film: polyamide/polypropylene based tie/polypropylene + compatibilizer/polypropylene based tie/polyamide |
| Base 4 | Monoaxially oriented film: polyamide/polypropylene based tie/polypropylene/polypropylene based tie/polyamide |
| Base 5 | Biaxially oriented film: polyamide/polypropylene based tie/polypropylene + compatibilizer/polypropylene based tie/polyamide |
| Base 6 | Biaxially oriented film: polyamide/polypropylene based tie/polypropylene/polypropylene based tie/polyamide |

TABLE 2

Examples of sealants useful in a Recyclable Film

| | |
|---|---|
| Sealant 1 | Blown film: polypropylene/polypropylene based tie/ethylene vinyl alcohol copolymer/polypropylene based tie/polypropylene |
| Sealant 2 | Blown film: polypropylene + compatibilizer/polypropylene based tie/ethylene vinyl alcohol copolymer/polypropylene based tie/polypropylene |
| Sealant 3 | Cast polypropylene |

TABLE 3

Examples of additional components useful in a Recyclable Film

| | |
|---|---|
| A | Oxygen barrier coating |
| B | Printed indicia |
| C | Polypropylene + compatibilizer layer |
| D | Biaxially oriented polyamide |
| E | Adhesive |

Using the references from Tables 1.2 and 3, the following structures of the recyclable film are presented as non-limiting example embodiments of recyclable films.

Base 1/B/E/Sealant 2
Base 2/B/E/Sealant 2
Base 3/B/E/Sealant 1
Base 3/B/E/Sealant 2
Base 3/B/E/D/E/Sealant 2
Base 3/A/B/E/Sealant 3
Base 4/A/B/E/Sealant 3
Base 4/B/E/Sealant 2
Base 5/B/E/Sealant 1
Base 5/B/E/Sealant
Base 5/B/E/D/E/Sealant
Base 5/A/B/E/Sealant 3
Base 6/A/B/E/Sealant 3
Base 6/B/E/Sealant 2

EMBODIMENTS

A) A recyclable film comprising:
  a) a base film comprising:
    i) a first polar layer comprising a polar polymer, and
    ii) a compatibilizer layer comprising a polar polymer compatibilizer,
  b) a sealant, and
  c) optionally, printed indicia located between the base film and the sealant, and
wherein the base film is oriented and annealed such that the base film has a free shrink value of less than 10% in both the machine direction and the transverse direction when tested according to ASTM D2732 using bath temperature of 90° C.

B) The recyclable film according to any of embodiments A through E, wherein the polar polymer of the first polar layer is a polyamide.

C) The recyclable film according to any of embodiments A through E, wherein the base film further comprises a second polar layer comprising a polar polymer.

D) The recyclable film according to any of embodiments A through E, wherein the first polar layer is an outer layer of the base film.

E) The recyclable film according to any of embodiments A through D, wherein the sealant comprises a sealing layer that is an outer layer of the recyclable film, the sealing layer comprising polypropylene.

F) A retortable package comprising the recyclable film according to any of embodiments A through E.

G) A recyclable film comprising:
  a) a first exterior surface comprising a base film, wherein the base film is oriented,
  b) a second exterior surface comprising a sealant comprising polypropylene,
  c) a polar layer comprising a polar polymer, and
  d) a compatibilizer layer comprising a polar polymer compatibilizer.

H) The recyclable film according to any of embodiments G through L further comprising a bather layer between the first exterior surface and the second exterior surface.

I) The recyclable film according to any of embodiments G through L wherein the first exterior surface comprises a polyamide.

J) The recyclable film according to any of embodiments G through L wherein the base film is a biaxially oriented polyamide.

K) The recyclable film according to any of embodiments G through L wherein the base film is a biaxially oriented polypropylene film.

L) The recyclable film according to any of embodiments G through K wherein the polar polymer is an ethylene vinyl alcohol copolymer.

M) A recyclable film comprising a base film comprising:
  a) a first outer layer comprising a polyamide,
  b) a compatibilizer layer comprising,
    i) a polypropylene, polypropylene copolymer or blends thereof, and
    ii) a compatibilizer comprising a low molecular weight anhydride or carboxylic acid functionalized polypropylene,
  c) a first tie layer located between the first outer layer and the compatibilizer layer,
  d) a second outer layer comprising a polyamide, and
  e) a second tie layer located between the compatibilizer layer and the second outer layer.

N) The recyclable film according to any of embodiments M through P wherein the base film is oriented.

O) The recyclable film according to any of embodiments M through P, further comprising a sealant.

P) The recyclable film according to any of embodiments M through O, wherein the sealant is a polypropylene.

Q) A retortable package comprising the recyclable film of any of embodiments M through P.

R) A retortable package comprising a recyclable film comprising a base film and a sealant, wherein at least one of the base film or the sealant comprises a polar polymer compatibilizer layer, and wherein the recyclable film is recyclable in a polypropylene waste stream.

S) The retartable package according to embodiment R or T, wherein the base film is oriented.

T) The retortable package according to embodiment R or S, wherein the recyclable film further comprises a barrier layer.

What is claimed is:

1. A recyclable film comprising:
  a) a base film comprising:
    i) a first polar layer comprising a polar polymer, and
    ii) a compatibilizer layer comprising a blend of polypropylene and a low molecular weight anhydride or carboxylic acid functionalized polypropylene,
  b) an unoriented sealant, and
  c) a barrier layer selected from the group consisting of ethylene vinyl alcohol copolymer located in the base film or in the unoriented sealant, metalization located between the base film and the unoriented sealant, and a barrier coating located between the base film and the unoriented sealant, and
  d) optionally, printed indicia located between the base film and the unoriented sealant, and wherein the base film is oriented and annealed such that the base film has a free shrink value of less than 10% in both the machine direction and the transverse direction when tested according to ASTM D2732 using bath temperature of 90° C., and
  wherein the recyclable film has an oxygen transmission rate from about 0.16 to 1.6 cc/m$^2$/day when tested at 23° C., and
  wherein the recyclable film is recyclable in a polypropylene waste stream.

2. The recyclable film according to claim 1, wherein the polar polymer of the first polar layer is a polyamide.

3. The recyclable film according to claim 1, wherein the base film further comprises a second polar layer comprising a polar polymer.

4. The recyclable film according to claim 1, wherein the first polar layer is an outer layer of the base film.

5. The recyclable film according to claim 1, wherein the unoriented sealant comprises a sealing layer that is an outer layer of the recyclable film, the sealing layer comprising polypropylene.

6. A retortable package comprising the recyclable film according to claim 1.

7. A recyclable film comprising:
  a) a first exterior surface comprising a base film, wherein the base film is oriented,
  b) a second exterior surface comprising an unoriented sealant comprising polypropylene,
  c) a polar layer comprising a polar polymer, and
  d) a compatibilizer layer comprising a blend of polypropylene and a low molecular weight anhydride or carboxylic acid functionalized polypropylene, and
  e) a barrier layer between the first exterior surface and the second exterior surface, wherein the barrier layer is selected from the group consisting of ethylene vinyl alcohol copolymer, metalization and a barrier coating, and
  wherein the recyclable film has an oxygen transmission rate from about 0.16 to 1.6 cc/m$^2$/day when tested at 23° C.

8. The recyclable film according to claim 7 wherein the first exterior surface comprises a polyamide.

9. The recyclable film according to claim 7 wherein the base film is a biaxially oriented polyamide.

10. The recyclable film according to claim 7 wherein the base film is a biaxially oriented polypropylene film.

11. The recyclable film according to claim 7 wherein the polar polymer is an ethylene vinyl alcohol copolymer.

12. A recyclable film comprising a base film comprising:
  a) a first outer layer comprising a polyamide,
  b) a compatibilizer layer comprising,
    i) a polypropylene, polypropylene copolymer or blends thereof, and
    ii) a compatibilizer comprising a low molecular weight anhydride or carboxylic acid functionalized polypropylene,
  c) a first tie layer located between the first outer layer and the compatibilizer layer,
  d) a second outer layer comprising a polyamide,
  e) a second tie layer located between the compatibilizer layer and the second outer layer; and
  f) a barrier layer consisting of ethylene vinyl alcohol copolymer,
  wherein the base film is oriented, and
  wherein the recyclable film further comprises an unoriented sealant.

13. The recyclable film according to claim 12, wherein the unoriented sealant is a polypropylene.

14. A retortable package comprising the recyclable film of claim 12.

* * * * *